United States Patent [19]

Buczek et al.

[11] 3,875,531
[45] Apr. 1, 1975

[54] INTEGRATED LASER SYSTEM

[75] Inventors: Carl J. Buczek, Manchester; Peter P. Chenausky, West Hartford; Robert J. Frieberg, South Windsor; Robert J. Wayne, East Hartford, all of Conn.

[73] Assignee: United Aircraft Corporation, East Hartford, Conn.

[22] Filed: Nov. 15, 1973

[21] Appl. No.: 416,319

[52] U.S. Cl. ............................ 331/94.5 G, 330/4.3
[51] Int. Cl. ........................................... H01s 31/09
[58] Field of Search ............... 331/94.5 G, 94.5 P; 330/4.3

[56] References Cited
UNITED STATES PATENTS
3,757,251  9/1973  Buczek et al. ................... 331/94.5

OTHER PUBLICATIONS

"Desk-size Carbon Dioxide Unit Delivers a Kilowatt C-W" Tiffany et al., Laser Focus, Sept. 1969, pp. 48 to 51.
"Electrode Configuration and Power Output for a Transverse Flow $CO_2$ Laser," Ben-Yosef et al., Jour. of Physics Part E: Scientific Ins. Vol. 4, Sept. 1971 pp. 708–709.

*Primary Examiner*—James W. Lawrence
*Assistant Examiner*—B. C. Anderson
*Attorney, Agent, or Firm*—Anthony J. Criso

[57] ABSTRACT

A compact, integrated, cross magnetic field, transverse electrid field, closed cycle, convective gas laser system is disclosed. A highly refined laser channel provides a stable electric discharge in the optical cavity with thin metal fins aligned in the flow direction; also the channel is effectively an integral heat exchanger which cools the working medium passing therethrough. Lightweight permanent magnets positioned about the channel align the discharge in the optical cavity. A flexible vane blower circulates the working medium within the vacuum envelope of the system. A compartmentated duct of dielectric material having rectangular geometry matched to the contours of the laser channel and the blower comprises the vacuum envelope for the system. The gas feed means, gas purge means and means for cooling the laser channel, which are all necessary to sustain operation of the cycle, are described. The parameters for an integrated system which provides a two hundred watt cw output beam of laser radiation are disclosed. The invention herein described was made in the course of or under a contract or subcontract thereunder with the Department of the Navy.

5 Claims, 9 Drawing Figures

INTEGRATED LASER SYSTEM

BACKGROUND OF THE INVENTION

1. Field of Invention

The present invention relates to lasers, and more particularly to an integrated, closed cycle, gas laser system.

2. Description of the Prior Art

The operation of gas laser systems in both open and closed cycle configuration is practiced regularly; Closed Cycle Gas Laser System — U.S. Pat. No. 3,634,778, Modified Open Cycle Gas Laser System — U.S. Pat. No. 3,641,453, Semiclosed Cycle Gas Laser System — U.S. Pat. No. 3,648,194 and Extended Closed Cycle Gas Laser Systems —U.S. Pat. No. 3,668,549 are representative of the art involved. The individual elements which interact in these systems are for the most part staple hardware items having a reasonably broad range of operational parameters. As a result of this range, various elements are able to cooperate sufficiently such that a functionable system can be constructed with them although the performance of such systems is often not optimized. Typically, as the range over which an element such as a gas blower can operate is broadened, the peak or optimum performance of the blower is compromised.

The usage of existing laser system in such applications as aircraft radar is limited by the unavailability of a compact an rugged system which provides reasonable output power and is packageable in a readily transportable configuration. A laser system in which each of the primary components is built with consideration given to both physical integration and operational factors is needed for airborne applications.

SUMMARY OF THE INVENTION

A primary objective of the present invention is to produce laser radiation with a compact system in which the performance and physical location of the essential components are integrated. Another object of the present invention is to provide laser radiation at a nominal output power between one hundred and one thousand watts with a conveniently transportable, rugged, laser system.

According to the present invention, a beam of stable frequency laser radiation is produced in a compact, integrated, closed cycle laser system having a flexible vane recirculator and an externally cooled, segmented, metal laser channel; the gaseous working medium is excited by an electric discharge which is positioned along the optic axis by an array of metal fins having suitable holes concentric about the optic axis, the fins acting to cool the working medium and to influence the aerodynamics of the working medium thereby producing laminar flow which results in greater frequency stability of the output radiation.

A primary advantage of the present invention is the simple compact rugged packaging of the system which allows its operation at full power while being subjected to a harsh vibrational environment in an airplane. Another advantage is the stable, single mode, single frequency output of the system.

A primary feature of the present invention is the rectangular geometry laser channel construction in which alternate layers of metal and nonconducting material are built up to form the channel walls. This construction eliminates the use of a porous dielectric in the vicinity of the discharge which can degrade the performance of a closed cycle laser. The invention includes apertured metallic fins which functions as flow conditions, electric discharge positioners, structural reinforcement for the channel walls and heat exchange elements. A reduced amount of magnetic material is able to provide the necessary magnetic field since the height of the discharge channel is minimized with the integrated construction. Another feature is the ow friction flexible vane gas recirculator which is essential to the system. In addition, the essential elements of the system are integrated into a combination of components which have a low impedance to flow particularly the heat exchanger which provide laminar flow conditions in the discharge channel thereby permitting the stable frequency output. The cooling of the working medium is greatly enhanced by the laser channel design which serves as both a laser flow channel and a heat exchange module; the channel provides a small region in which the laser medium is excited and a large contact surface with which the medium is cooled.

The foregoing and objects, features and advantages of the present invention will become more apparent in the light of the following detailed description of preferred embodiments thereof as illustrated in the accompanying drawings.

BRIEF DESCRIPTION OF A PREFERRED EMBODIMENT

The present invention involves the use of an electric discharge laser 10 such as the Transverse Gas Laser disclosed by Bullis et al in U.S. Pat. No. 3,743,963 with a flex vane blower 12, a coolant system 14, an electric power supply 16, a laser channel 18, a gas feed system 20 and a purge system 22 as is shown schematically in FIG. 1; a first flow means 24 and a second flow means 26 provide a main gas conduit 28 between the laser channel and the gas blower. The coolant system includes a heat exchanger 30 and a coolant pump 32 connected by suitable piping 34 to the laser channel. The feed system is primarily a gas storage tank 36 connected to the second flow means with an interposed feed gas valve 38; the purge system includes a vacuum pump 40 connected to the first flow means with a vacuum valve 42.

Figure 2:
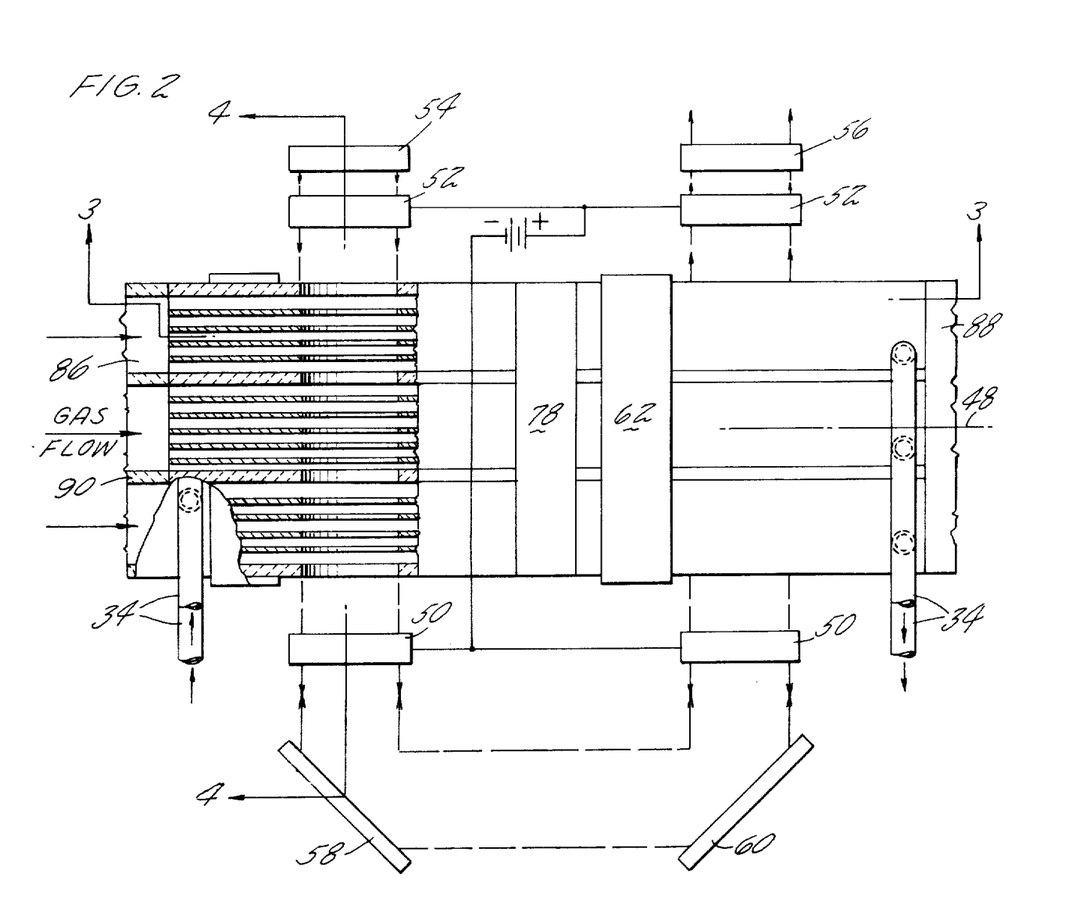
FIG. 2 is a partially broken-away simplified top view of the laser discharge channel shown schematically in FIG. 1.
Figure 3:
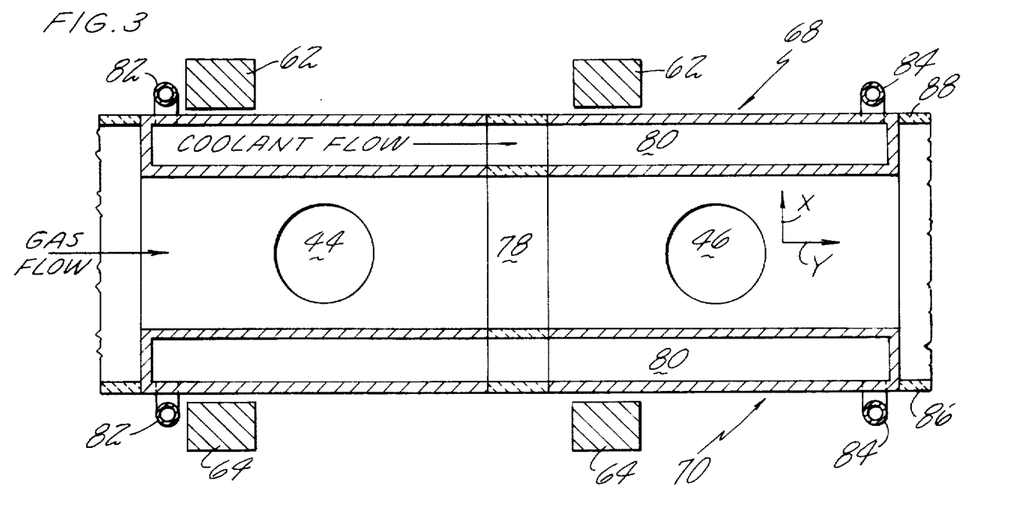
FIG. 3 is a simplified sectional view takn in the longitudinal direction through the discharge channel.

The main components of the laser channel are shown in FIG. 2, a top view of the channel, and in FIG. 3, an elevation view taken longitudinally through the channel. A pair of discharge regions 44, 46 is established transverse to a longitudinal axis 48 and between cathodes 50 and anodes 52 which are hollow ring electrodes. A folded path laser oscillator is formed between a reflecting end mirror 54 and a partially transmitting end mirror 56; a pair of folding mirrors 58, 60 completes the optical path between the end mirrors. Permanent magnets 62, 64 are positioned adjacent to the channel upstream of, and essentially parallel to, the discharge regions.

Figure 4:
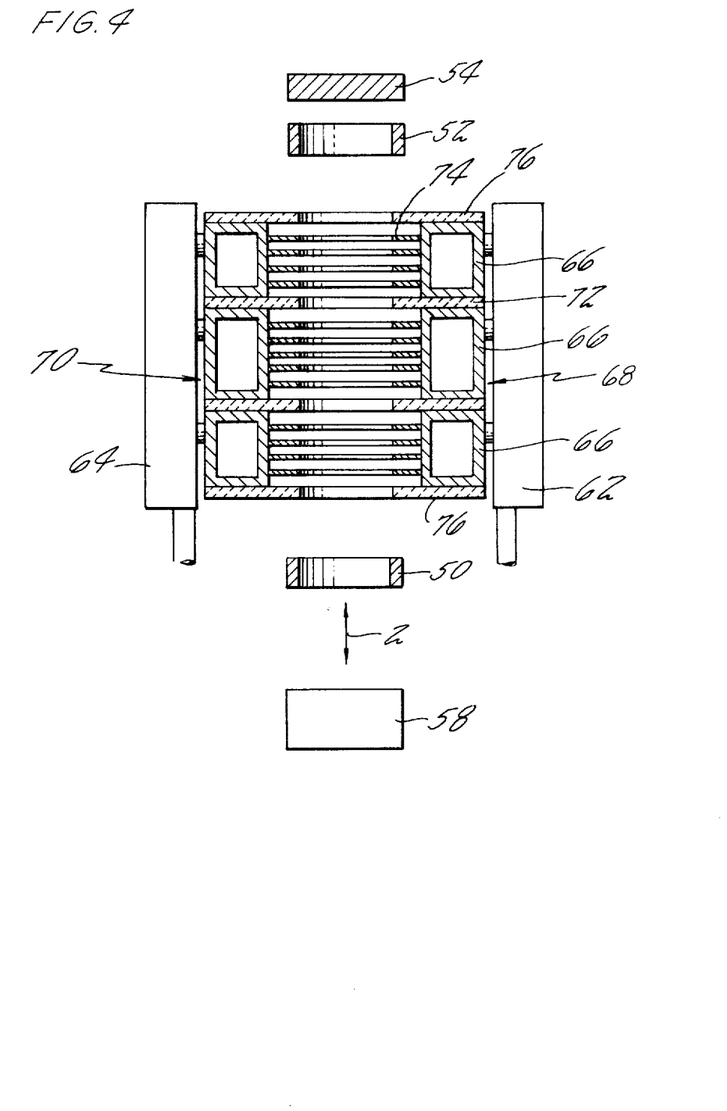
FIG. 4 is a simplified sectional view taken transversely through the discharge channel.
Figure 5:
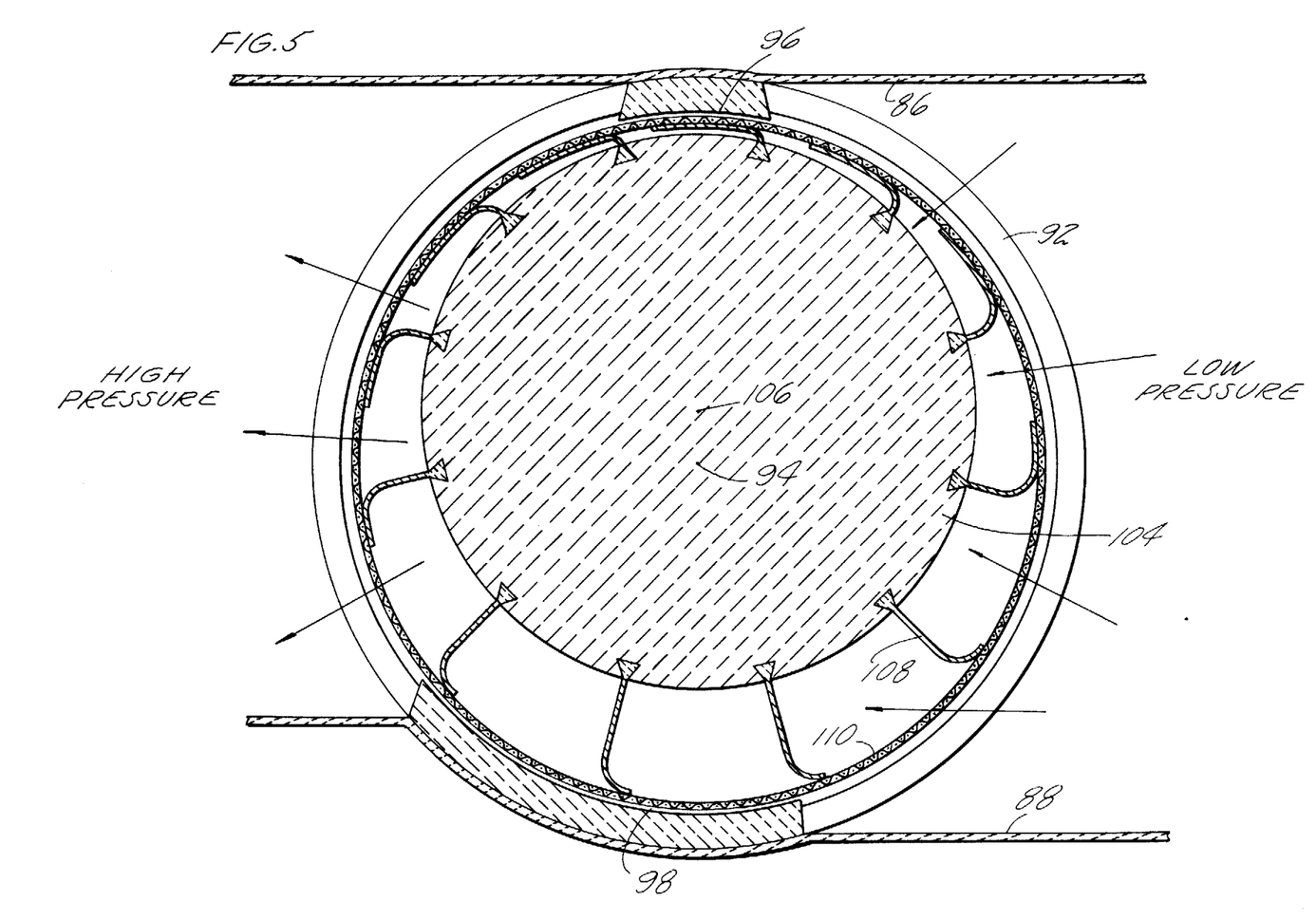
FIG. 5 is a simplified cross-sectional view through the gas blower shown schematically in FIG. 1.

The laser channel has rectangular cross section of high aspect ratio as is apparent from FIG. 4. The channel comprises a plurality of metal tubes 66 which are joined together in a rigid heat exchanger device. Each tube is physically similar to a wave guide having a cross section as shown in FIG. 4 and a length as shown in FIGS. 3 and 5. The tubes are combined into continuous structures to form a top plate 68 and a bottom plate 70 for the channel. Each tube is aligned parallel to the axis 48 and a spacer 72 of electrical insulator material is placed between adjacent tubes. Metal fins 74 are fixedly attached between opposing top and bottom tubes to form modular building units; side walls 76 are very similar to the spacers. Each of the side walls, the spacers and the fins has holes therethrough to permit an unobstructed optical path having an optical axis along each of the discharge regions between the mirrors 54–58 and 56–60. The multiple discharge channel as is discussed above is assembled with an insulator strip 78 incorporated into the tubes and fins. The strip electrically isolates the metal surrounding the discharge 44 from the metal surrounding the discharge 46. Each of the wave guide type tubes 66 is hollow and has a fluid passageway 80 therethrough. A fluid delivery manifold 82 communicates with each of the fluid passageways at one end of the top plate and a fluid discharge manifold 84 communicates with each of the passageways at the other end of the top plate; an identical manifold structure exists on the bottom plate. The fluid manifolds communicate with the heat exchanger 30 through the piping 34.

The first flow means 24 and the second flow means 26 are ducts of essentially rectangular cross section through their entire length having an inner wall 86 and an outer wall 88. The cross sectional areas of the ducts are matched to the cross sectional areas of the laser channel and the blower at all the interface locations between these components thereby providing a gas flow path of integrated geometry throughout the entire main gas conduit in the laser system. Internal to each flow means is a plurality of flow dividers 90 which are joined to the inner and outer walls, are parallel to the direction of gas flow and are spaced apart in an amount equal to the width of a modular unit. The entire main gas conduit as well as the flow dividers incorporated therein are constructed of a dielectric material such as a fiberglass epoxy laminate to minimize the possibility of allowing spurious discharge paths to form parallel to the preferred discharge path.

Figures 6A, 6B, 7:
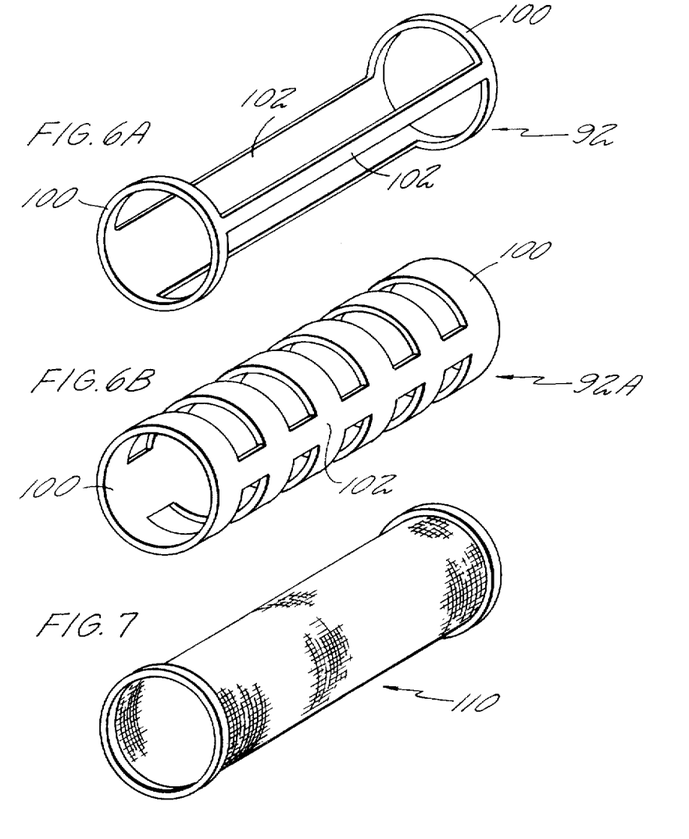
FIG. 6A is a simplified perspective view of a preferred gas blower outer housing.
FIG. 6B is a simplified perspective view of an alternate gas blower housing.
FIG. 7 is a simplified perspective view of the gas blower perforated cage.

The flex vane blower is shown in detail in FIG. 5. The inner wall 86 and the outer wall 88 connect the laser channel and the blower; in addition these walls support the blower. A cylindrical outer housing 92 having a central axis 94 is fixedly attached to the walls and forms a narrow gap seal 96 and a wide gap seal 98 along the entire central axis. The housing is essentially a cylindrical structure comprising a pair of end rings 100 fixedly attached to a pair of spacer bars 102 as is shown in FIG. 6A. The openings between the spacer bars allow gas to enter the blower housing from the lower pressure side of the gas seals and leave from the high pressure side of the seals. A rotor 104 having an axis of rotation 106 is mounted eccentric of the central axis 94. A plurality of flexible vanes 108 are fixedly attached to the rotor and a perforated cage 110 is mounted concentric with the housing; the cage is a thin metal cylinder which is perforated throughout and as shown in FIG. 7 has the appearance of a cylindrical screen. The cage is supported on a pair of large diameter bearings located in the end rings of the housing and is free to spin. During rotation of the rotor the vanes cause the cage to free spin the amount of sliding friction between the vanes and the perforated cage is greatly reduced. An alternate blower design is essentially the apparatus described above without the perforated cage. The outer housing 92A comprises a thin metal cylinder with a series of circumferential slots cut between the spacer bars as is shown in FIG. 6B. During operation of the alternate design blower, the flexible vanes directly contact the outer housing.

In a typical laser system operated in accordance with the present invention, direct current discharges are produced in the gaseous working medium which is convectively cooled in the segmented metal channel and is recirculated by the gas blower in the closed loop system in which the geometry and material of the primary gas handling components are integrated to provide a total package of minimum physical size and weight. The flow conditions are laminar as the gas passes through the laser cavity which has an optical axis transverse to the direction of flow. The electric discharge is maintained about the optical axis and a magnetic field transverse to both the optical axis and the flow direction is applied to the discharge to distribute it throughout the optical region. The entire system shown in FIG. 1 when sized for approximately two hundred watts of output laser power can be packaged in a cube which is nominally two feet on each edge.

The operation of the suggested system involves charging the system with a suitable working medium such as a mixture of carbon dioxide, nitrogen and helium from the gas feed system and adjusting the pressure in the laser channel to a suitable condition which is typically between twenty to forty Torr. The blower 12 which is a flexible vane pump driven by a prime mover is rotated at approximately two thousand revolutions per minute to provide a pressure rise in the system of five to ten Torr. All of the major components of the blower are constructed of a suitable dielectric material such as Teflon, fiberglass epoxy laminate; alternatively, metal components separated by short lengths of fiberglass epoxy laminate may be used. The blower which is packaged as a cylinder, one foot in height and diameter, pumps the working medium through the system at one thousand cubic feet per minute. The purge system is operated to continuously remove about ten cubic feet per minute of the working medium. The removal of gas avoids the build up in the loop of materials deleterious to the laser operation. The coolant system is activated to remove the waste heat from the working medium by the laser channel. The channel is constructed for the most part of a high conductivity metal and therefore the entire channel acts as an efficient heat exchanger for the gaseous working medium. The channel surfaces are sized to provide the required cooling. In the two hundred watt output system being described, the channel has an overall cross section which is one-half inch high and twelve inches wide; the length is seventeen inches. Each modular building unit is one inch high, one-half inch wide and separated from the adjacent unit by a spacer one thirty-second inch thick. The tubes have a forty mil wall thickness and a one-quarter inch by one-half inch overall cross section. The thirty two mil thick fins joining the top and bottom tubes of each modular unit are one-half inch high, seventeen inches long and spaced one-eighth inch apart; the holes in the fins are three-eights inch in diameter. The sink to which the heat exchanger 30 dumps is not discussed in any detail since any convenient heat sink will suffice, however, the coolant which transfers the heat from the channel to the exchanger must be a dielectric such as deionized water to prevent shorting of the discharges. The electric discharge is maintained with a voltage gradient of ten thousand voltage per foot between each of the anode cathode pairs describing the discharge region in the laser channel. The drawing shows a laser oscillator having a folded path and two distinct discharge regions; alternate configurations involving various combinations of oscillator regions and amplifier regions may also be used.

The gas blower shown in FIGS. 5-7 relies on the centrifugal force developed during rotation of the rotor to force the essentially unsupported flexible vanes against the cage to provide the necessary sealing; the vanes which are constructed of thin fiberglass fabric and the perforated cage are in continuous contact during operation of the blower. While better sealing conditions exist when the perforated cage is removed from between the rotor and the outer housing of the blower, the overall performance of the device is inferior to the blower with a cage. The cageless blower configuration has been found to have a large driving power requirement which is undesirable because of the concomitant problems associated with a driver of increased size and the additional heat removal from the working medium which is implicitly involved. In addition, the cageless blower causes torn and split vanes after limited periods of usage and particles of vane material flake off becoming trapped in the working medium and leading to degradation in the system performance. The power required to activate the rotor within the stationary housing is proportional to the cube of the tangential velocity of the vane in contact with the housing. Since a great deal of this power is merely overcoming friction between the vanes and the housing, a decrease in the tangential velocity of the vane leads to substantial overall system benefits. Theoretically the vane friction losses can be reduced to zero by rotating the housing at the same speed as the vane. As a practical matter, this is not possible since the rotor is not concentric with the housing and at some points on the inferface between the housing and the vanes the tangential velocities must be mismatched. In addition, there is the very real consideration that with perfectly matched rotor and housing velocities there would be no pumping action either. In the blower configuration shown in FIG. 5, the vanes have their lowest velocity at the narrow gas seal and a low friction blower design results when the vane tangential velocity is matched to the cage tangential velocity at the narrow gap seal position. At all positions where the velocities are not matched, the vanes slide over the cage but at a slower relative velocity than would occur if the vanes were in contact directly with the housing. The clearance between the housing and the perforated cage in the narrow gap and wide gap seal regions is nominally five to ten one thousandths of an inch. During operation of the pump, the rotor is driven by an electric motor and the friction between the vanes and the perforated cage drives the latter in the same direction as the rotor and at a speed which approaches the ideal condition described above.

Movement of the working medium through the laser channel at a typical velocity of fifty meters per second, tends to push the electric discharge out of the optical cavity as is discussed in U.S. Pat. No. 3,747,015 issued to C. J. Buczek, entitled Magnetic Stabilized Cross Field Flowing Gas Laser. The prior art teaches that as the power level is increased in the operation of a transverse flow laser, either the gas pressure or the current density must also be increased; as the magnitude of these parameters increases and the discharge undergoes a radial construction particularly as the glow mode of electrical discharge approaches the transition to an arc mode of discharge. Constriction of the discharge produces a tendency for the discharge to heat up and to deviate from a straight line path between the electrodes and the latter limits the optical power which can be extracted from the working medium. A known method of discharge stabilization in a cross field laser uses a tapered magnetic field and is based on the interaction of the magnetic field with the electric current to produce a force on the electric discharge counter to the aerodynamically induced force which tends to blow the discharge out of the discharge region as is disclosed by Buczek. For this type of flow stabilization, the tapered magnetic field is arranged so that the partial derivative of the magnetic field in the Y direction (transverse to the aerodynamic displacement force) with respect to the incremental change in the Z direction (distance along the direction of flow) is greater than zero. Under this criterion, the magnetic stabilizing force increases when the discharge is displaced downstream because the magnetic field increases in strength with incremental changes in displacement in this direction; the net result is the discharge tends to return to an equilibrium position as has been thoroughly described elsewhere. By way of contrast, the present invention uses similar physical equipment to provide a tapered magnetic field which leads to horizontal instability in the electric discharge positioning under conditions where the partial derivative of the magnetic field in a direction transverse to the working medium flow with respect to incremental changes in the direction of flow is a negative value. The net result of this negatively tapered magnetic field is that the interaction of the aerodynamically flow forces and the magnetic field forces do not act in opposite directions to create the potential well disclosed by Buczek in order to stabilize the electric discharge about some desired axis. Rather the flow field forces and the magnetic field forces balance only in the horizontal or flow plane. With the negatively tapered magnetic field, small vertical displacements in the discharge usually due to inhomogeneities in the flow field result in a restoring force in the vertical direction induced by the magnetic field. Thus, in this case, this restoring force tends to maintain the electric discharge symmetrically about the horizontal flow plane through the center of the discharge region.

Figure 1:
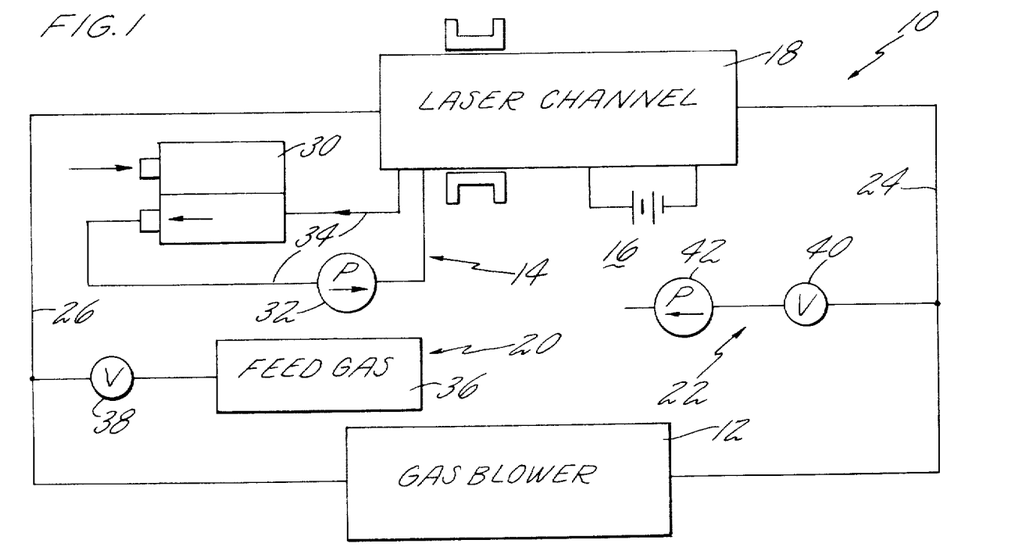
FIG. 1 is a simplified schematic diagram of an integrated closed cycle gas laser system in accordance with the present invention.

The total weight of each pair of magnets as shown in FIGS. 1-3 is less than ten pounds; each magnet is approximately four inches square and when spaced approximately one inch apart a magnetic field of seven hundred fifty gauss is provided.

As discussed above, the transverse laser with a negatively tapered magnetic field across the discharge regions is unstable in the flow plane, a condition which is unacceptable for most laser applications. However, the application of apertured fins in much the same manner is described by Buczek et al in U.S. Pat. No. 3,757,251 entitled Direct Current Auxiliary Ionization of an Axially Excited Flowing Gas Laser avoids the problem. In addition to stabilizing the electric discharge against the effects of fluid flow as is described in the art, the apertured fins in the present invention also provide efficient cooling of the working medium before, during and after the medium passes through the discharge region. When a multipath laser as is described herein is operated, the working medium leaving the discharge region 46 for example has a population in the lower laser level which is sufficient to severely degrade the gain for the medium in the discharge region 48; however, the presence of the fins 74 as is shown best in FIGS. 3 and 4 permits the transfer of heat from the working medium to the fins and in turn to the coolant. The fins are constructed of a material such as copper or aluminum sheet which has a high heat conductivity thereby providing good heat transfer from the working medium. In addition to positioning the discharge along the optical axis which is vital to the operation of the laser system, the parallel array of thin fins throughout the laser channel insures laminar flow conditions for the working medium as it passes through the channel. Laminar flow is very desirable in this region since the presence of turbulence is accompanied by frequency instability in the extracted laser radiation. Further, as is apparent from FIG. 4, the parallel fin array results in stiffening of both the top and bottom plates of the laser channel thereby permitting a reduction in thickness and overall weight of the flow channel.

While the metal fins serve the multiple functions of stabilizing the discharge, stiffening the top and bottom plates, cooling the working medium and providing laminar flow conditions for the working medium, they must be used with discretion to avoid shorting out the electric discharge. Consideration is given to the voltage drop in the cathode fall region and the strength of the electric field across the plasma column. For example, a typical discharge requiring three hundred volts across the cathode fall region can tolerate a continuous length of metal conductor up to one centimeter adjacent to the discharge without incurring a shorting condition for a plasma discharge having a field strength of three hundred volts per centimeter. In a practical transverse laser configuration, a series of copper conductors arranged in accordance with the present invention with suitable spacers of electrical insulator material have been operated with the metal strips up to three quarters of an inch in the direction of the discharge.

Figure 8:
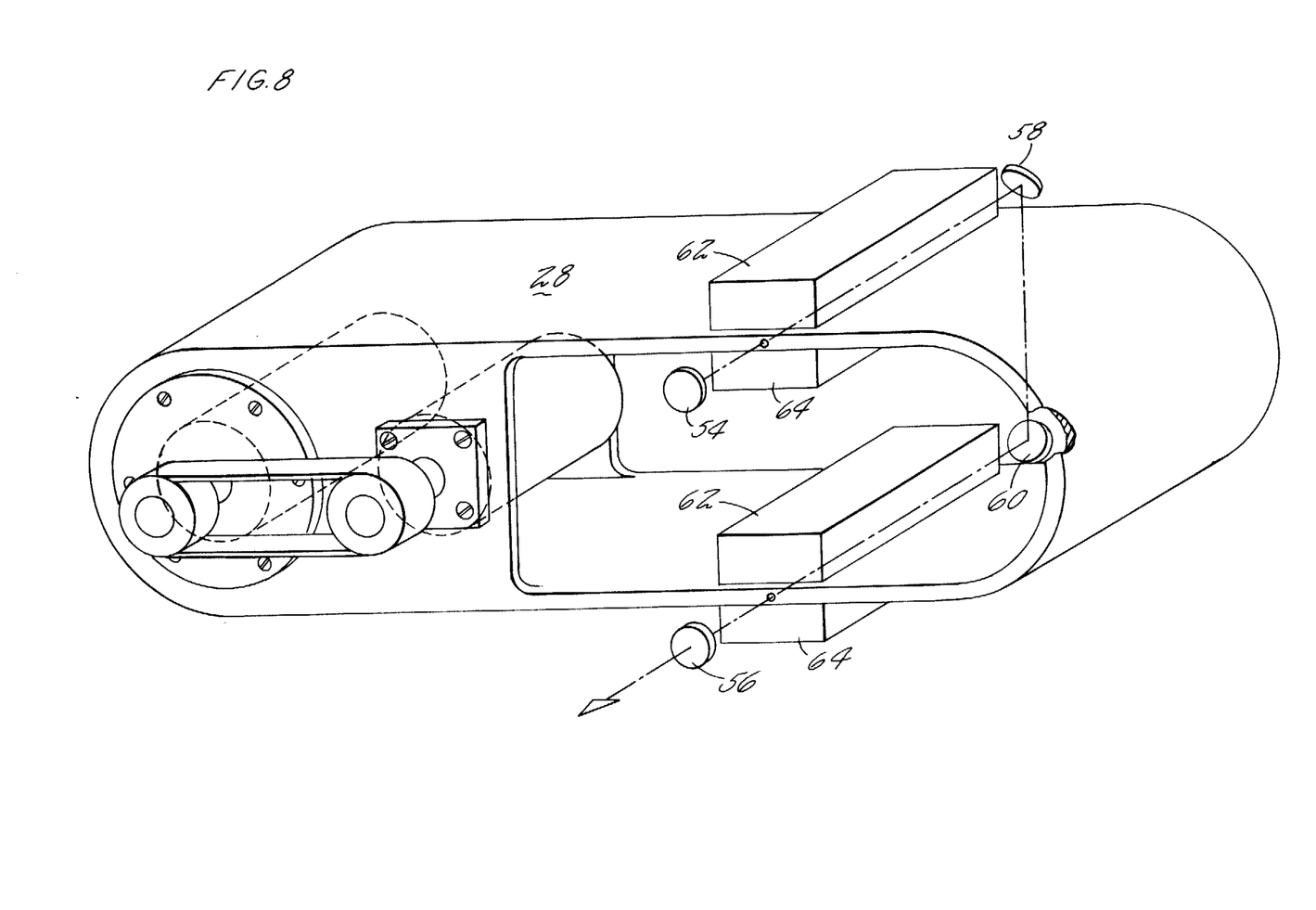
FIG. 8 is a simplified perspective view of an integrated closed cycle gas laser system in accordance with the present invention.

FIG. 8 is a simplified perspective view of the actual package geometry for an entire integrated laser system built in accordance with the present invention.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. A closed cycle system for the production of stable frequency radiation with a transverse field laser comprising:

a laser channel for the production of coherent radiation by stimulated emission from an excited gaseous working medium flowing along a longitudinal axis through the channel which has a gas passageway therethrough perpendicular to the longitudinal axis, the passageway having a rectangular cross section and a high aspect ratio, the channel having a plurality of juxtaposed metal modules which are physically separated from one another by thin sheets of dielectric material, each module comprising a hollow top tube and a hollow bottom tube joined by a plurality of metal fins aligned in parallel along the longitudinal axis, and the channel including:

optical means for coupling the coherent radiation out of the excited working medium as an optical beam which traverses the channel through a series of holes concentric with an optical axis for the beam, the optical axis being perpendicular to the longitudinal axis; and electric discharge means comprising annular electrodes which are concentric about the optical axis;

gas pumping means for overcoming the pressure drop required to flow the working medium from the gas inlet to the gas outlet of the channel and to recirculate the medium from the gas outlet back to the gas inlet;

a main gas conduit formed of dielectric materials comprising:

first flow means connecting the channel gas outlet with the low pressure side of the gas blower; and second flow means connecting the high pressure side of the gas blower with the channel gas inlet;

a source of electric power connected to the annular electrodes to produce a discharge plasma along the optical axis by maintaining an electric potential between the electrodes; and heat exchange means for the removal of heat absorbed from the working medium in the channel by the modules, the exchange means including a dielectric coolant which is passed through fluid passageways in the top and bottom tubes of each module.

2. The invention according to claim 1 including further means for providing a magnetic field in a direction which is essentially perpendicular to both the optical axis and the channel longitudinal axis, the magnetic field having an intensity profile which tapers diminishingly from the upstream side of the electric discharge to the downstream side of the discharge.

3. The invention according to claim 1 including further a source of gaseous working medium with means for continuously admixing additional gas to the system during operation through the second flow means.

4. The invention according to claim 3 including further a gas purge system with means for continuously removing working medium from the system during operation through the first flow means.

5. The invention according to claim 4 including further a plurality of dielectric separation partitions which extend throughout the entire main gas conduit to separate the flow means into a plurality of parallel flow channels.

* * * * *